United States Patent Office 2,984,600
Patented May 16, 1961

2,984,600
PLANT RUST ERADICANT

Dexter B. Sharp, Dayton, Ohio, assignor to Monsanto Chemical Company, St. Louis, Mo., a corporation of Delaware No Drawing. Filed Sept. 21, 1954, Ser. No. 457,554
10 Claims. (Cl. 167—30)

The present invention relates to new and useful improvements in biological toxicants and more particularly provides new and valuable eradicants for cereal plant rusts, especially wheat, and methods of treating plants susceptible to attack by rusts in which methods said eradicants are used.

I have found that unusually effective fungicidal compositions are obtained when the active ingredient is a hydrazone derived from a substituted hydrazine having the formula

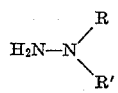

in which R is a hydrocarbon radical free of non-benzenoid unsaturation and R' is selected from the class consisting of R and hydrogen and a hydrocarbon ring mono-ketone having from 5 to 18 carbon atoms and free of non-benzenoid unsaturation.

The presently useful hydrazones are readily obtainable in known manner by condensation of an appropriate hydrocarbon hydrazine with the appropriate ring ketone.

One group of hydrazines having the above formula and useful for the preparation of the present fungicidally active hydrazones includes the alkyl or the 1,1-dialkylhydrazines having from 1 to 12 carbon atoms in the alkyl radical, e.g., ethyl-, amyl-, or n-octylhydrazine or 1,1-di-n-propyl-, 1,1-diisohexyl- or 1-amyl-1-butylhydrazine. Another group includes the cycloalkyl- or 1,1-dicycloalkylhydrazines, e.g., cyclopentyl-, 1,1-dicyclohexyl- or 1-cyclohexyl-1-1-(3-methylcyclopentyl)hydrazine. Still another group includes the aralkyl or the 1,1-bis-(aralkyl)hydrazines such as 2-phenylethylhydrazine or 1,1-dibenzyl hydrazine. A very useful group includes hydrazines having an aryl or alkaryl radical of up to 12 carbon atoms attached to one nitrogen atom and either hydrogen or a hydrocarbon radical free of non-benzenoid unsaturation attached to the same nitrogen atom, e.g., phenylhydrazine, p-tolylhydrazine, 2,4-dimethylphenylhydrazine or 2-ethylphenylhydrazine and the 1-alkyl, aryl, aralkyl, alkaryl or cycloalkyl derivatives thereof such as 1-methyl-1-phenylhydrazine, 1-isoamyl-1-phenylhydrazine, 1-cyclohexyl-1-o-tolylhydrazine, 1-benzyl-1-phenylhydrazine, 1,1-diphenylhydrazine, etc. In the useful hydrazines, there may be only one hydrocarbon radical attached to one of the nitrogen atoms or there may be two of the same hydrocarbon radicals or two dissimilar hydrocarbon radicals attached to the one nitrogen atom. Because of the easy availability of phenylhydrazine, the condensation products of this particular hydrazine derivative and the ring ketones are advantageously used in the preparation of the present fungicidal compositions.

Hydrocarbon ring mono-ketones which are free of non-benzenoid unsaturation and which contain from 5 to 18 carbon atoms are generally useful for the preparation of the presently employed hydrazones. An important class of such ketones comprises the cycloalkanones and the alkyl, cycloalkyl and aryl derivatives thereof such as cyclopentanone, 2,5-dimethylcyclopentanone, cyclohexanone, 2-, 3- or 4-methyl-, ethyl-, tert-butyl-, n-octyl- or n-decylcyclohexanone; 2-isopropyl-5-methyl cyclohexanone, i.e., methone; 2,3-, 3,5- or 2,6-dimethylcyclohexanone, 2,2,3,6-tetramethylcyclohexanone, 2-ethyl-3,5,5-trimethylcyclohexanone, 2- or 4-cyclohexylcyclohexanone, 2-, 3- or 4-phenylcyclohexanone, etc.

Another useful class of hydrocarbon ring ketones employed for the preparation of the present rust eradicating aryl- or 1-alkyl-1-arylhydrazones comprises those having an aromatic ring system fused bivalently to a cycloalkane ring, e.g., 1- or 2-indanone, 2-, 3-, 4 or 6-methyl-1-indanone, 2,2- or 4,7-dimethyl-1-indanone; acenaphthenone and pyrenone. Still another class comprises the hydrazones of partially hydrogenated aromatic ring ketones such as α- or β-tetralone.

Cereal rust eradicants comprising the present hydrazones as the essential effective ingredients function as plant chemotherapeutants against the various leaf and stem rusts of wheat, barley, rye and oats and other small grain crop plants. Such cereal rusts as the stem rust *Puccinia graminis tritici*, or the leaf rust *P. rubigo-vera tritici* or the stripe rust *P. glumarum* of wheat usually cannot be controlled by general purpose fungicides. The stem and crown rusts of oats (*P. graminis avenae* and *P. coronata avenae*), as well as the stem rust of rye (*P. graminis secalis*) or the leaf rust (*P. hordei*) of barley display similar resistance. In prior art, much effort has been expended in the past in breeding rust-resistant strains of these cereals; but as new strains of e.g., wheat, are developed, new races of the above classes of rusts appear and proceed to attack the new, presumably rust-resistant strains of wheat. The history of breeding for rust-resistance thus comprises a recurrent introduction of cereal strains which are resistant to prevailing races of the rusts and subsequent appearance of new races of rusts to which the recently introduced cereal strains are susceptible. Accordingly, the eradication of fungus growth by chemical treatment of cereal plants has become subjected to close scrutiny. Unfortunately, most of the known fungicides have been found to be unsuitable either because they do not prevent or destroy rust growth at non-phytotoxic concentrations or because their physical and chemical nature prevents a commercially expedient means of application. Particularly when aerial dusting or spraying is the contemplated means of application, particle size and solubility are of extreme importance.

Rust eradicant compositions may be prepared by mixing the present hydrazones with dusting materials such as talc, clay, lime, bentonite, pumice, fuller's earth, etc. The majority of the hydrazones will be found to be water-insoluble. These may be dissolved in organic solvents therefor and the resulting solutions used as fungicidal or fungi-preventing sprays. More expediently, a small amount of a concentrated solution of the hydrazone compound in an organic solvent, e.g., cyclohexanone, may be added to water in the presence of an emulsifying agent to form an emulsion, and the oil-in-water emulsion thus obtained is employed as a spray. Suspensions or dispersions of the hydrazone compounds in a non-solvent such as water, or aqueous solutions of the water-soluble compounds, are advantageously employed in the treatment of plant foliage.

The present invention is further illustrated, but not limited by the following examples:

*Example 1*

The therapeutic effect of the phenylhydrazone of 3,3,5-trimethylcylcohexanone against wheat rust was determined as follows:

Five uniform, six-day-old seedlings of a rust-susceptible variety of wheat (Seneca) was sprayed with water by means of an atomizer. The individual leaves were then gently rubbed between the thumb and index finger to remove the "bloom," and then inoculating with *Puccinia rubigo-vera tritici* by gently scraping up and down the back sides of the rubbed leaves, a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed with an emulsion prepared as follows:

The trimethylcyclohexanone phenylhydrazone (100 mg.) was added to 5 ml. of acetone, and there was then introduced to the resulting solution approximately 0.1 ml. of an emulsifying agent known to the trade as "Tween 20" and reputed to be a polyoxyethylene sorbitan monolaurate. The whole was then diluted with 5 ml. of water to give an emulsion containing 1% by weight of the hydrazone. For the instant test the 1% emulsion was further diluted with water to give a concentration of 0.5% by weight of the test compound.

Spraying of the plants with the emulsion was effected by means of an atomizer, 5 ml. of the emulsion being used per pot of 5 plants. The sprayed plants were then returned to the greenhouse and held there for a week. Observation of the plants at the end of that time disclosed complete inhibition of rust in the case of the inoculated and sprayed plants, and no evidence of any phytotoxic effect of the spray. Similarly inoculated, but unsprayed plants, which had been maintained in the incubator and greenhouse for the same length of time were found to be badly affected by the rust.

*Example 2*

Testing of the phenylhydrazone of cyclohexanone using the test procedure of Example 1 showed extensive suppression of rust at the 0.5% concentration.

*Example 3*

When the phenylhydrazone of 1-indanone was submitted to the test procedure described in Example 1, marked inhibition of rust growth was noted at the 0.5% concentration at which concentration there was no evidence of phytotoxicity.

What I claim is:

1. The method of protecting cereal plants against rust fungi which comprises applying to said plants a rust inhibiting quantity of a rust eradicant composition comprising as the essential active ingredient the phenylhydrazone of a saturated hydrocarbon ring mono-ketone having from 5 to 18 carbon atoms.

2. The method of inhibiting the development of rust on wheat which comprises applying to the wheat a rust inhibiting quantity of a wheat rust eradicant comprising as the essential active ingredient the phenylhydrazone of a saturated hydrocarbon ring mono-ketone having from 5 to 18 carbon atoms.

3. The method of inhibiting the development of rust on wheat which comprises applying to the wheat a rust inhibiting quantity of a wheat rust eradicant comprising as the essential active ingredient the phenylhydrazone of a cycloalkanone of from 5 to 18 carbon atoms.

4. The method of inhibiting the development of rust on wheat which comprises applying to the wheat a rust inhibiting quantity of a wheat rust eradicant comprising as the essential active ingredient the phenylhydrazone of a ring monoketone having an aromatic ring system fused bivalently to a cycloalkanone ring and containing up to 18 carbon atoms.

5. The method of protecting cereal plants against rust fungi which comprises applying to said plants a rust eradicant composition containing the phenylhydrazone of 3,3,5-trimethyl cyclohexanone as the essential active ingredient.

6. The method of protecting cereal plants against rust fungi which comprises applying to said plants a rust eradicant composition containing the phenylhydrazone of cyclohexanone as the essential active ingredient.

7. The method of protecting cereal plants against rust fungi which comprises applying to said plants a rust eradicant composition containing the phenylhydrazone of 1-indanone as the essential active ingredient.

8. The method of inhibiting the development of rust on wheat which comprises applying to the wheat a rust inhibiting quantity of a wheat rust eradicant comprising the phenylhydrazone of 3,3,5-trimethylcyclohexanone as the essential active ingredient.

9. The method of inhibiting the development of rust on wheat which comprises applying to the wheat a rust inhibiting quantity of a wheat rust eradicant comprising the phenylhydrazone of cyclohexanone as the essential active ingredient.

10. The method of inhibiting the development of rust on wheat which comprises applying to the wheat a rust inhibiting quantity of a wheat rust eradicant comprising the phenylhydrazone of 1-indanone as the essential active ingredient.

References Cited in the file of this patent

UNITED STATES PATENTS 2,054,062    Bonrath _____ Sept. 15, 1936

FOREIGN PATENTS 460,545    Germany _____ June 1, 1928

OTHER REFERENCES

Bushland: J. of Econ. Entomology, vol. 33 (1940), pp. 669–676.